United States Patent
Zhou

(10) Patent No.: US 10,387,495 B2
(45) Date of Patent: Aug. 20, 2019

(54) SYSTEM AND METHOD FOR EFFICIENT INTERVAL SEARCH USING LOCALITY-PRESERVING HASHING

(71) Applicant: Palo Alto Research Center Incorporated, Palo Alto, CA (US)

(72) Inventor: Rong Zhou, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 520 days.

(21) Appl. No.: 15/179,780

(22) Filed: Jun. 10, 2016

(65) Prior Publication Data
US 2017/0357732 A1    Dec. 14, 2017

(51) Int. Cl.
G06F 16/903      (2019.01)
G06F 16/901      (2019.01)

(52) U.S. Cl.
CPC ........ G06F 16/9014 (2019.01); G06F 16/901 (2019.01); G06F 16/90348 (2019.01)

(58) Field of Classification Search
USPC ................................................. 707/747, 698
See application file for complete search history.

(56) References Cited

U.S. PATENT DOCUMENTS

| | | | |
|---|---|---|---|
| 6,691,126 B1* | 2/2004 | Syeda-Mahmood | G06F 17/30247 382/104 |
| 6,757,686 B1* | 6/2004 | Syeda-Mahmood | G06F 17/3028 |
| 7,363,325 B2* | 4/2008 | Yianilos | G06F 16/2246 |
| 2002/0029214 A1* | 3/2002 | Yianilos | G06F 17/30327 |
| 2005/0091443 A1* | 4/2005 | Hershkovich | G06F 16/2246 711/100 |
| 2012/0089647 A1* | 4/2012 | Jagota | G06F 16/24558 707/800 |

* cited by examiner

*Primary Examiner* — Cheyne D Ly
(74) *Attorney, Agent, or Firm* — Shun Yao; Park, Vaughan, Fleming & Dowler LLP

(57) ABSTRACT

Embodiments of the present invention provide a time- and space-efficient system for representing and searching a set of intervals to find all the intervals that overlap with a given query interval or point. A new structure called an interval hash table is introduced to significantly reduce the average search time, thereby improving computing and search technology. During operation, the system obtains data indicating a set of intervals to be hashed. The system divides a respective interval into a set of sub-intervals based on a locality-preserving hashing. The system then obtains a hash code associated with a respective sub-interval, and inserts the respective sub-interval into an interval hash table at a location corresponding to the hash code. The system may further search the interval hash table.

17 Claims, 10 Drawing Sheets

SYSTEM AND METHOD FOR EFFICIENT INTERVAL SEARCH USING LOCALITY-PRESERVING HASHING

BACKGROUND

Field

The present disclosure relates to interval search. More specifically, this disclosure relates to a method and system for representing and searching a set of intervals to find all the intervals that overlap with a given query interval or point.

Related Art

Intervals are uninterrupted sets of dense, ordered elements. The dense elements may be truly continuous like the real numbers, or may simply be dense, ordered elements such as IP addresses or URLs. An interval is uninterrupted, and therefore contains all the dense, ordered elements in a range.

The problem of searching a set of intervals to find all the intervals that overlap with a given query interval or point has many applications including internet and packet routing, classless inter-domain routing (CIDR), geo-IP search, geographical information systems, memory management, garbage collection, persistent object-oriented databases, and web-server access control. For example, the geo-IP search application may be used in Customer Care to find the geo-location of a customer based on his or her IP address (for recommendation and customization).

The conventional approaches to interval searching are based on data structures called interval trees, which are a special type of binary search trees (usually implemented as red-black trees) designed for answering interval queries efficiently. An interval tree can be built in O(n log n) time, using O(n) space, where n is the number of intervals. It can be searched in O(log n+k) time, where k is the number of intervals in the output.

Although interval trees are the current state-of-the-art, their O(log n+k) search time may not satisfy the real-time requirements for many applications such as packet routing, which often must use special hardware to speed up interval query. Interval trees must divide elements between left and right branches, leading to considerations of balance, and possible dependence of storage location on the order in which elements are stored. Therefore, binary search in arrays is usually more time efficient than binary search in trees, which may not be perfectly balanced in all of the branches. Regarding storage, interval trees' heavy use of pointers can increase significantly the space overhead, especially on 64-bit machines, where pointers are twice the size of those on 32-bit machines. Finally, interval searching is essentially pointer chasing in the binary search tree, which produces poor memory reference locality and thus may not benefit from the memory hierarchy of modern processors such as the L1 and L2 caches that are much faster than RAM.

SUMMARY

One embodiment of the present invention provides a system and method for interval hashing and search. During operation, the system obtains data indicating a set of intervals to be hashed. The system divides a respective interval into a set of sub-intervals based on a locality-preserving hashing that maps nearby elements to nearby hash codes. The system then obtains, via the locality-preserving hashing, a hash code associated with a respective sub-interval. The system then inserts the respective sub-interval into an interval hash table at a location corresponding to the hash code. The system then stores the interval hash table in a non-transitory storage medium.

In a variation on this embodiment, the system may obtain, via the locality-preserving hashing, a low hash code for a lowest-ordered element and a high hash code for a highest-ordered element of the respective interval. The system may form a set of hash codes including the low hash code, a hash code or codes intermediate to the low and high hash codes, and the high hash code. The system may obtain a maximal interval associated only with a respective hash code in the set of hash codes, wherein the maximal interval is not subsumed by any larger interval associated only with the respective hash code. The system may identify a respective sub-interval associated with the respective hash code based on the obtained maximal interval and the lowest-ordered element and highest-ordered element of the respective interval.

In a variation on this embodiment, the system may receive a search query comprising a search interval. The system may divide the search interval into a set of search sub-intervals based on the locality-preserving hashing. The system may obtain, via the locality-preserving hashing, a search hash code associated with a respective search sub-interval. The system may search the hash table for intervals associated with the hash code that overlap with the respective search sub-interval, based on comparing lowest- and highest-ordered elements of a second interval with lowest- and highest-ordered elements of the respective search sub-interval.

In a variation on this embodiment, the interval hash table may be a disjoint interval hash table, such that the obtained set of intervals associated with the search hash code is disjoint. The respective search sub-interval may comprise a single search element, such that the lowest- and highest-ordered elements of the respective search sub-interval equal the search element. Determining whether a respective interval overlaps with the search element may further comprise using a binary search.

In a variation on this embodiment, the system may perform a classless inter-domain routing (CIDR) block lookup based on the interval hash table.

In a variation on this embodiment, the system may perform a one-sided binary search. The system may obtain a set of intervals associated with the search hash code ordered based on a respective lowest-ordered element of a respective interval. Responsive to determining that the respective search sub-interval cannot overlap a middle interval in the obtained set of intervals, the system may discard intervals in the ordered set ordered on one side of the middle interval.

In a variation on this embodiment, the interval hash table may be a disjoint interval hash table, such that the obtained set of intervals associated with the search hash code is disjoint. The one-sided binary search may further comprise using a nested binary search. Responsive to determining that the respective search sub-interval can overlap the middle interval, the system may perform an inner one-sided binary search.

In a variation on this embodiment, the interval hash table may be a consecutive interval hash table that represents a respective interval by storing a single lowest-ordered or highest-ordered element. Responsive to two respective intervals being separated by an empty space, the system may store a dummy interval in the consecutive interval hash table to represent the empty space intermediate to the two respective intervals.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of searching a set of intervals to find all the intervals that overlap with a given interval or point by hashing intervals in an interval hash table. The methods and systems disclosed herein can find overlapping intervals in a time- and space-efficient manner, including provably asymptotically optimal point search. The present invention also offers a spectrum of time-space tradeoffs (while still performing well with respect to both criteria), making it effective for a wide variety of applications and devices. For example, the instant system enables high-performance GeoIP lookups within tens of nanoseconds. During operation, the system obtains data indicating a set of intervals to be hashed. The system divides a respective interval into a set of sub-intervals based on a locality-preserving hashing. The system then obtains a hash code associated with a respective sub-interval, and inserts the respective sub-interval into an interval hash table at a location corresponding to the hash code. The system may further search the interval hash table.

The system improves computing technology and a computer's ability to query and search intervals and points. The system and methods disclosed herein can significantly improve runtime compared to previous technology, and in some cases can also be more space-efficient. Interval hash tables as disclosed herein also offer a spectrum of time-space tradeoffs, making it possible to use the same implementation in different applications with various real-time and storage requirements. The present invention has many applications, including internet and packet routing, classless inter-domain routing (CIDR), geo-IP search, IP-to-median-income lookup, geographical information systems, memory management, garbage collection, persistent object-oriented databases, and web-server access control.

Figure 1A:
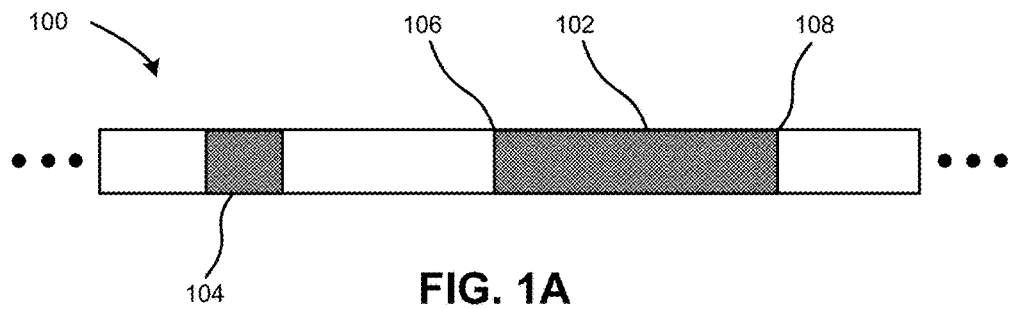
FIG. 1A illustrates an example of intervals.

FIG. 1A illustrates an example of intervals. As shown, the intervals are continuous subsets or segments in a continuum 100 of elements. Continuum 100 may be a truly continuous set like the set of real numbers, or it may be a dense, ordered set of elements such as a set of IP addresses or URLs. Note that in finite precision, a computerized representation of a continuous set, such as floating point numbers representing the set of real numbers, may also be dense and ordered without being truly continuous. An interval is uninterrupted, and therefore contains all the dense, ordered elements in a range. For example, intervals 102 and 104 are subsets of continuum 100. As illustrated in FIG. 1A, interval 102 has a lowest-ordered element, or end point, 106, and highest-ordered element 108, and therefore contains all elements within continuum 100 between 106 and 108. In some embodiments of the present invention, the system represents an interval within an interval hash table, or other data structure, by the interval's two end points, as well as by an interval ID or index field.

Figure 1B:
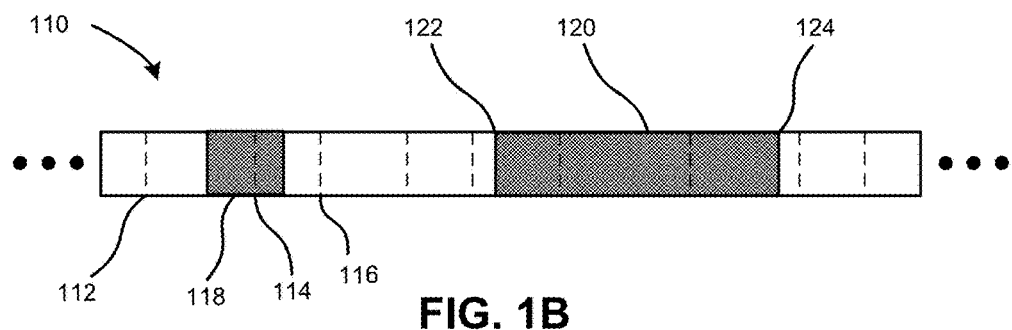
FIG. 1B illustrates an example of dividing intervals into discrete sub-intervals.

FIG. 1B illustrates an example of dividing intervals in a continuum 110 into discrete sub-intervals. In embodiments of the present invention, the system "quantizes" or "discretizes" intervals in order to store and search intervals efficiently. This introduces granularity in continuum 110. For example, boundaries 112, 114, and 116 demarcate discrete regions within continuum 110. In embodiments of the present invention, the quantized sub-intervals of an interval would be chosen based on the discrete regions occupied by the interval.

Note that an interval may span more than one discrete sub-interval, and may have end points that do not coincide with the boundaries of the discrete regions. For example, as shown in FIG. 1B, interval 120 has lower end point 122 and upper end point 124. In the case where an interval completely subsumes a discrete region, the corresponding quantized sub-interval would equal this discrete region. But in the case where an interval end point is interior to a discrete region, in some embodiments the corresponding quantized sub-interval would end at the end point of the original interval. For example, interval 120 would be divided into three discrete sub-regions: the outer two discrete sub-regions would end at end points 122 and 124, and the middle discrete sub-region would occupy an entire discrete region. Similarly, interval 118 would be divided into two discrete sub-regions.

When searching intervals based on quantizing them, it may be important to find an optimal granularity to compromise between quality and cost of discretization. In embodiments of the present invention, the system may resolve this issue by employing a locality-preserving hash function to discretize intervals.

Figure 1C:
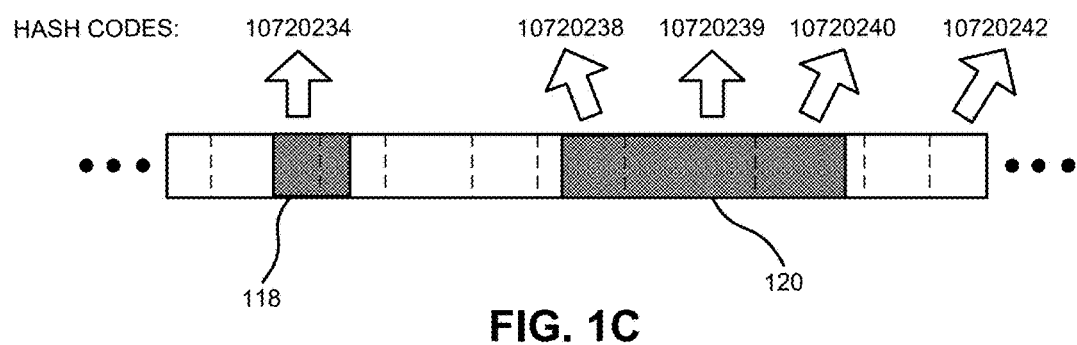
FIG. 1C illustrates an example of dividing intervals into discrete sub-intervals based on a locality-preserving hashing.

FIG. 1C illustrates an example of dividing intervals into discrete sub-intervals based on a locality-preserving hashing. Locality-preserving hashing maps "near-by" intervals to the same or neighboring hash codes. This preserves the proximity of intervals in the hash-table slots that are used to index them. The system may also make use of an inverse of the locality-preserving hash function that returns the maximal interval of all possible intervals mapping to a given hash code. The maximal interval is defined with respect to interval subsumption, i.e., the maximal interval is not a sub-interval of any other interval mapping to the given hash code.

FIG. 1C illustrates how the discrete regions in FIG. 1B may be chosen, according to some embodiments. As shown, each discrete region in continuum 110 is a maximal interval mapping to a single hash code. Therefore, in some embodiments, discretizing intervals such as 118 and 120 involves identifying a set of hash codes associated with a respective interval, and dividing the respective interval into discrete sub-intervals mapping to a single hash code. For example, interval 120 is associated with three hash codes, and therefore is divided into three discrete sub-intervals.

System Architecture

Figure 2:
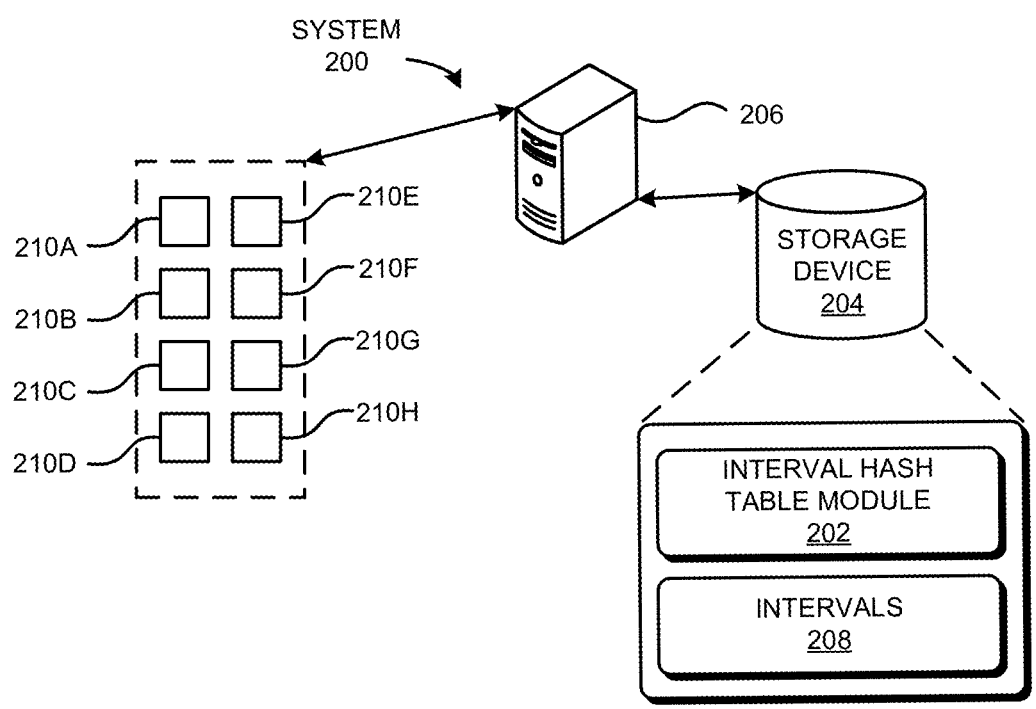
FIG. 2 presents a block diagram illustrating an exemplary architecture of an interval search system utilizing interval hash tables, according to embodiments of the present invention.

FIG. 2 presents a block diagram illustrating an exemplary architecture of an interval hashing system 200 utilizing the interval hashing and search method, according to an embodiment of the present invention. An interval hashing system 200 may divide a set of intervals and search for overlapping intervals, according to embodiments, in parallel with multiple processors. In standard systems, system 200 would require significant computational cost and space to search for overlapping intervals. However, using the methods disclosed herein, system 200 enables the user to search for overlapping intervals in less time and space.

Interval hashing system 200 may include an interval hash table module 202 installed on a storage device 204 coupled to a server 206. Note that various implementations of the present invention may include any number of servers and storage devices. In various implementations, interval hashing module 202 may include an interval discretizing module or other components of interval hashing system 200 to perform the techniques described herein. System 200 may receive data describing intervals, and store such data in storage device 204. System 200 may read the code for interval hash table module 202 and the data for intervals 208 from storage device 204. System 200 may divide a set of intervals, and assign them to processors, such as processors 210A-210H, which operate on the assigned intervals.

Method for Interval Hashing

Figure 3:
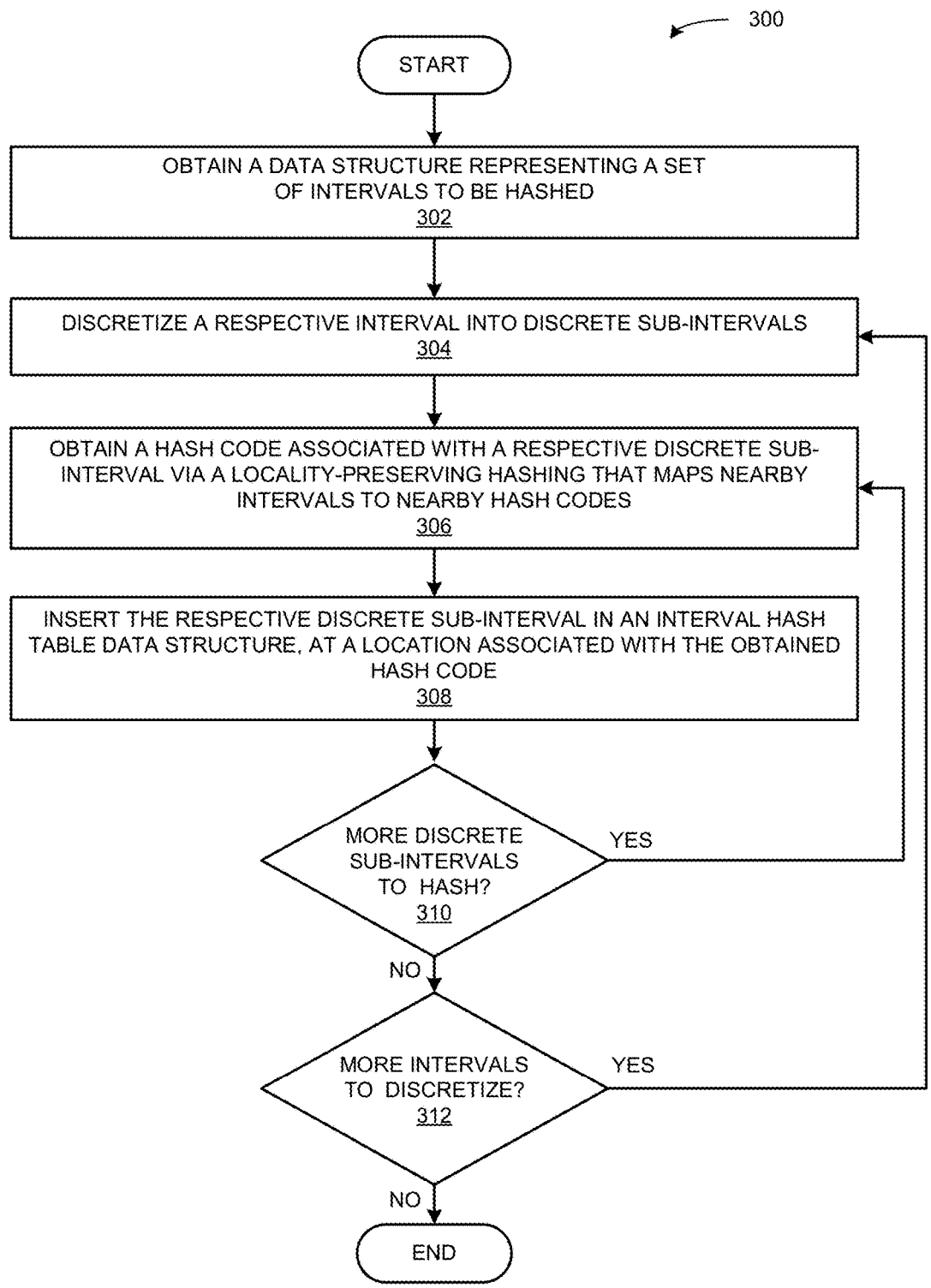
FIG. 3 presents a block diagram illustrating a method for interval hashing according to embodiments of the present invention.

FIG. 3 presents a flowchart 300 illustrating a method for interval hashing, according to embodiments of the present invention. During operation, the system obtains data indicating a set of intervals to be hashed (operation 302). The system may then discretize a respective interval into a set of discrete sub-intervals based on a locality-preserving hash function (operation 304). Locality-preserving hashing maps "nearby" intervals to the same or neighboring hash codes.

One way to create a locality-preserving hash function is to use locality-preserving abstractions. An abstraction is a relaxation that projects a problem into an abstract space in which only a subset of the variables needed to encode the problem are considered. For example, the IP address of 13.1.101.131 can be abstracted as 13.*.*.* (or *.*.*.131) by ignoring some of the octets in its quartet encoding. There are usually multiple ways of performing abstraction for the same problem, and some abstractions preserve the locality better than others.

In the above IP address example, abstraction 13.*.*.* is better than abstraction *.*.*.131 because two 13.*.*.* IP addresses have a higher chance of being on the same subnet than two *.*.*.131 addresses, which may very well be on two separate subnets. Thus, the former is more locality-preserving than the latter. One can further refine the 13.*.*.* abstraction by considering additional octet(s). For example, both 13.1.*.* and 13.1.101.* are more locality-preserving than the original single-octet abstraction. Among the three locality-preserving abstractions, 13.1.101.* is the most refined, and it has the largest abstract space with a total size of $256^3$; whereas the 13.*.*.* abstraction is the least refined with an abstract space of size 256, the smallest of the three. This example leads to a fundamental locality vs. space tradeoff: as an abstraction's ability to preserve locality increases, so does its space requirement. Hypothetically, one could use the identity abstraction by considering all the variables (e.g., all four octets in our IP address example), which would create a loss-less abstraction that is guaranteed to preserve 100% of the locality, but unfortunately such an "ideal" abstraction is usually too space inefficient to be practical (e.g., requiring a hash table of $256^4$ slots for the IPv4 address space). Thus, one must strike a balance between preserving locality and conserving memory. The interval hash table disclosed herein is such a data structure that offers an effective balance between these two conflicting goals.

The system may then obtain a hash code associated with a respective discrete sub-interval via the locality-preserving hash function (operation 306). The system may then insert the respective sub-interval into an interval hash table at a location corresponding to the hash code (operation 308).

While conventional hash tables can use either chaining or open addressing to resolve hash collisions, in embodiments of the present invention, the system uses chaining to preserve the locality of intervals. Furthermore, in embodiments of the invention, the number of hash-table slots in an interval hash table must equal the number of possible hash codes (e.g., the size of the abstract space) produced by the locality-preserving hash function. Thus, there is no need to perform a modulus operation to convert from a hash code to the corresponding hash-table slot, since the two are the same in an interval hash table. In embodiments of the invention, hash codes and hash-table slots are used as interchangeable concepts.

The system may then determine whether more discrete sub-intervals remain to be hashed (operation 310). Responsive to determining that more discrete sub-intervals remain to be hashed, the system may then repeat the hashing process starting from hashing operation 306.

Responsive to determining that no more discrete sub-intervals remain to be hashed, the system may then determine whether more intervals remain to be discretized. Responsive to determining that more intervals remain to be discretized, the system may then repeat the discretization process starting from discretization operation 304.

Responsive to determining that no more intervals remain to be discretized, the system may then return the discretized intervals.

Method for Discretizing Intervals

Figure 4:
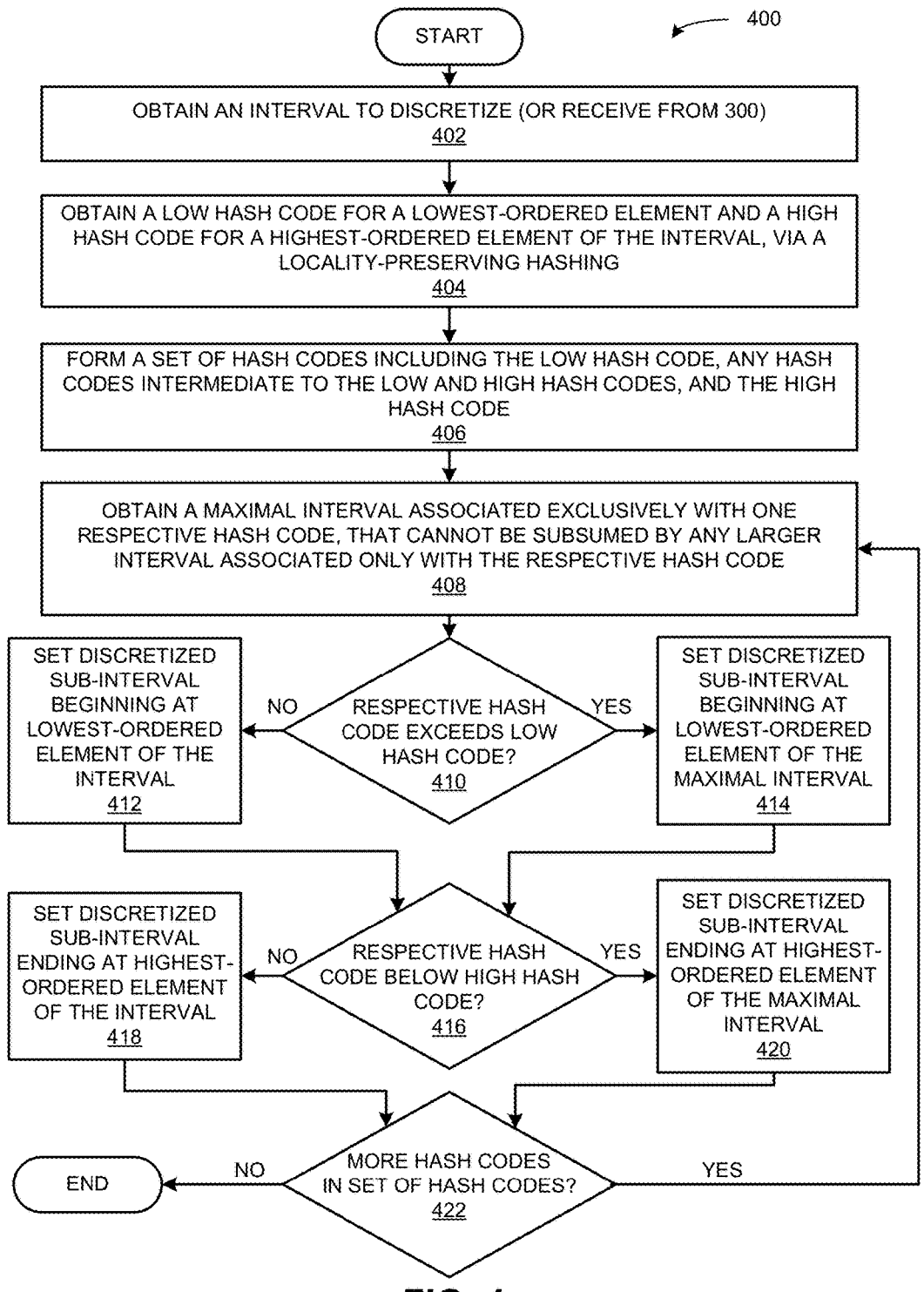
FIG. 4 presents a block diagram illustrating a method for interval discretization according to embodiments of the present invention.

FIG. 4 presents a block diagram illustrating a method 400 for interval discretization according to embodiments of the present invention. Note that method 400 provides details of step 304, discretizing a respective interval, in method 300, just as FIG. 1C provides details of FIG. 1B. Discretizing an interval will also be referred to herein as dividing or quantizing an interval. During operation, the system obtains data indicating an interval to be discretized (operation 402). Alternatively, in step 402, the system may receive the interval to be discretized from method 300. The system may obtain a low hash code for a lowest-ordered element and a high hash code for a highest-ordered element of the interval via the locality preserving hash function (operation 404).

The system may then form a set of hash codes including the low hash code, any hash codes intermediate to the low and high hash codes, and the high hash code (operation 406). Note that in some cases, the low and high hash codes may be equal, in which case, the set of hash codes would only contain one hash code. In case the low and high hash codes are neighboring, the set of hash codes would not contain any intermediate codes.

The system may then obtain a maximal interval associated exclusively with one respective hash code, that cannot be subsumed by any interval associated only with the respective hash code (operation 408). Note that a first interval is defined as subsuming a second interval if the second interval is a sub-interval of the first interval, or equivalently, if the second interval's end points belong to the first interval.

As described earlier, the quantized sub-interval may end at the end point of the original interval, or at the boundaries of a discrete region, depending on whether the original interval subsumes the discrete region. Therefore, the system may next determine whether the respective hash code exceeds the low hash code (operation 410). Responsive to determining that the respective hash code is less than or equal to the low hash code, the system may then set the discretized sub-interval to begin at the lowest-ordered element of the interval (operation 412). Responsive to determining that the respective hash code exceeds the low hash code, the system may then set the discretized sub-interval to begin at the lowest-ordered element of the maximal interval (operation 414).

The system may then determine whether the respective hash code is less than the high hash code (operation 416). Responsive to determining that the respective hash code exceeds or equals the high hash code, the system may then set the discretized sub-interval to end at the highest-ordered element of the interval (operation 418). Responsive to determining that the respective hash code is less than the high hash code, the system may then set the discretized sub-interval to end at the highest-ordered element of the maximal interval (operation 420).

Finally, the system may determine whether there remain additional hash codes in the set of hash codes. Responsive to determining that there are additional hash codes, the system may then repeat the discretization process starting from operation 408, obtaining a maximal interval for a next respective hash code. Responsive to determining that no more hash codes remain in the set, the system may then return the discrete sub-intervals.

Interval Search

Figure 5:
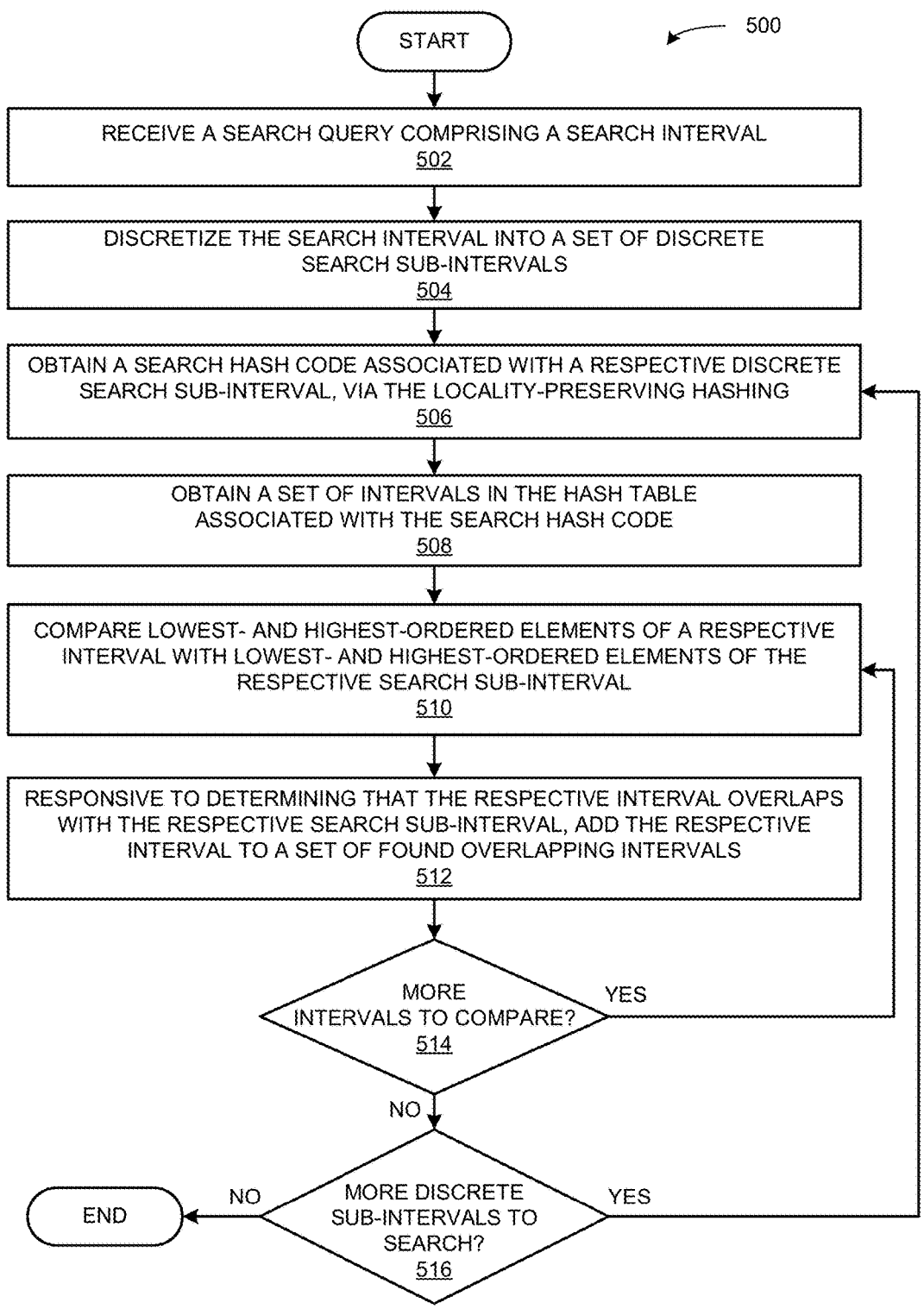
FIG. 5 presents a block diagram illustrating a method for interval search, according to embodiments of the present invention.

FIG. 5 presents a block diagram illustrating a method 500 for searching for intervals in a hash table that overlap with a given interval, according to embodiments of the present invention. During operation, the system receives a search query including a search interval (operation 502). The system may then discretize the search interval into a set of discrete search sub-intervals (operation 504), for example by method 400. The system may then obtain a search hash code associated with a respective discrete search sub-interval (operation 506) via a locality-preserving hash function, as described previously. The system may then identify a set of intervals in the hash table associated with the obtained search hash code (operation 508).

The system may then determine whether a respective interval in the identified set of intervals overlaps the respective search sub-interval, based on comparing lowest- and highest-ordered elements of the respective interval with lowest- and highest-ordered elements of the search sub-interval (operation 510). Responsive to determining that the respective interval overlaps with the search sub-interval, the system may add the respective interval to a set of found overlapping intervals (operation 512).

The system may then determine whether more intervals remain in the set of intervals in the hash table associated with the search hash code (operation 514). Responsive to determining that more intervals remain, the system may repeat the comparison process starting from comparison operation 510. Responsive to determining that no more intervals remain, the system may then determine whether more discrete sub-intervals remain to search (operation 516). Responsive to determining that more discrete sub-intervals remain, the system may repeat the searching process starting from hashing operation 506. Responsive to determining that no more intervals remain, the system may then return the set of found overlapping intervals.

One-Sided Binary Search

Figure 6:
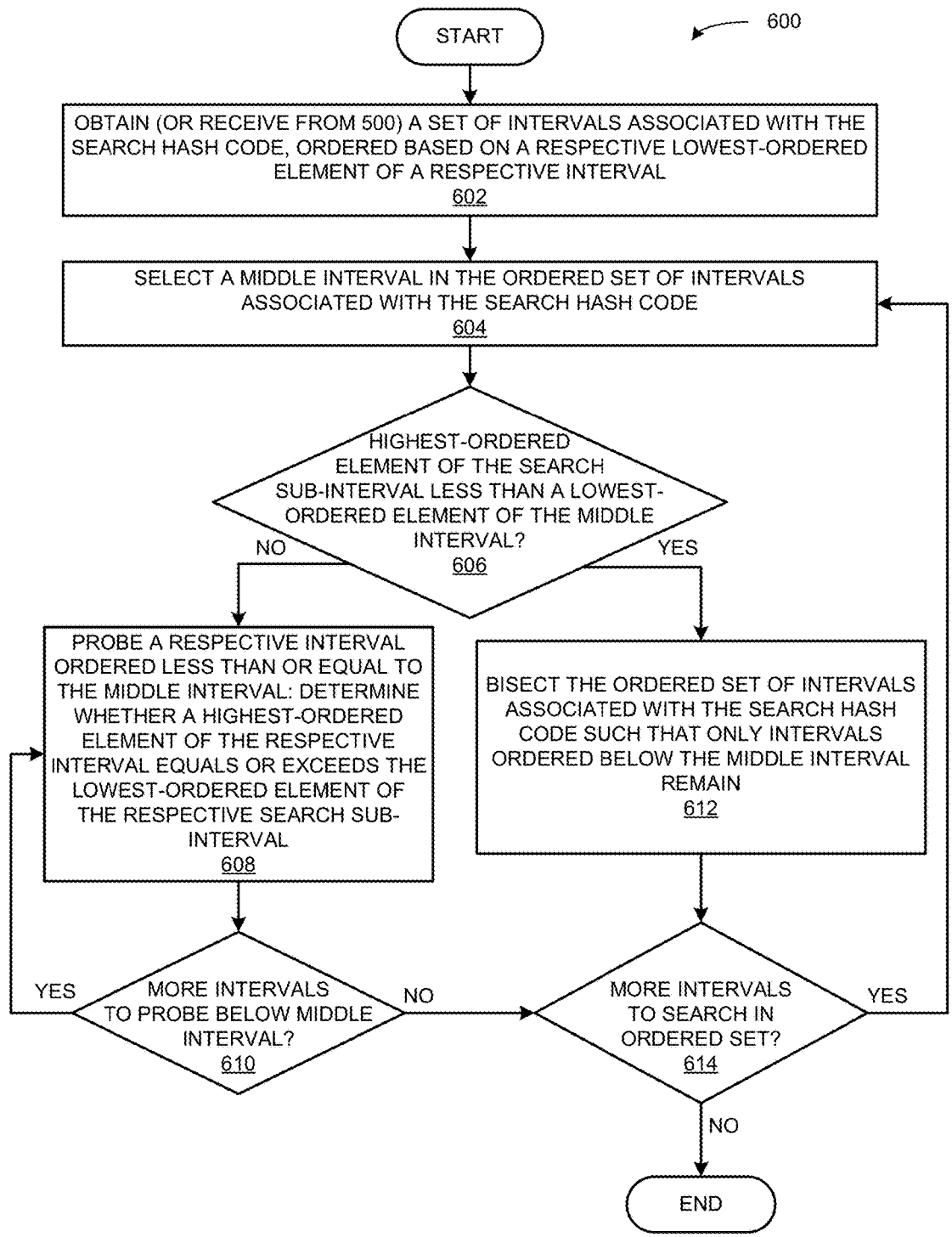
FIG. 6 presents a block diagram illustrating a method for interval search with one-sided binary search, according to embodiments of the present invention.

FIG. 6 presents a block diagram illustrating a method 600 for interval search based on one-sided binary search, according to embodiments of the present invention. Note that method 600 provides details of step 510 of method 500, i.e., comparing elements to determine whether a respective interval overlaps with the respective search sub-interval, in a general case. The one-sided binary search may first involve testing a necessary condition for overlap, to determine whether it is possible for the respective search sub-interval to overlap a middle interval in the obtained set of intervals. This necessary condition will be described in more detail in method 600, and explained further later in this disclosure. Then responsive to determining that this overlap is impossible, the system may discard intervals in the ordered set ordered on one side of the middle interval. The one-sided binary search used in some embodiments differs from a standard binary search because the ordered set is bisected only when the condition is satisfied.

During operation, the system obtains a set of intervals associated with a search hash code (operation 602). Alternatively, in step 602, the system may receive the set of intervals from method 500. In some embodiments, the obtained set may be ordered based on a respective lowest-ordered element of a respective interval.

The system may then select a middle interval in the ordered set of intervals (operation 604). In some embodiments, the system may select the middle interval by averaging interval IDs or indices associated with lowest- and highest-ordered intervals in the ordered set. The system may then determine whether the middle interval satisfies a necessary condition, such that it can possibly overlap the search sub-interval. In some embodiments, the system does so by comparing the high end point of the search sub-interval to the low end point of the middle interval (operation 606). Note that by comparing the high end point of the search sub-interval to the low end point of the middle interval, the system simultaneously determines whether intervals ordered below the middle interval can overlap the search sub-interval. In other embodiments, the system may instead compare the low end point of the search sub-interval to the high end point of the middle interval, which also would provide information about intervals ordered above the middle interval.

Responsive to determining that the high end point of the search sub-interval exceeds or equals the low end point of the middle interval (i.e., that overlap is possible with the middle interval or with intervals below it), the system may linearly probe intervals below the middle interval. In some embodiments, the system may probe a respective interval ordered below or equal to the middle interval by comparing a high end point of the respective interval to the low end point of the search sub-interval (operation 608). Note that operations 606 and 608 together represent necessary and sufficient conditions for overlap, as described below. Thus, once it has been determined that the intervals on one side of the middle interval can possibly overlap the search sub-interval, the linear probing may be used to determine which of these intervals do overlap with it. The system may then determine whether more intervals remain to probe below the middle interval (operation 610). Responsive to determining that intervals remain to probe, the system may repeat the probing process from probing operation 608. Responsive to determining that no intervals remain to probe, the system may continue to operation 614.

Responsive to determining in step 606 that the high end point of the search sub-interval is less than the low end point of the middle interval (i.e., that overlap is impossible with the middle interval or with intervals below it), the system may bisect the ordered set of intervals. In some embodiments, the system may do this by discarding the middle interval and the intervals above it (operation 612). The system may then determine whether intervals remain to search in the ordered set (operation 614). Responsive to determining that intervals remain to search, the system may then repeat the search process, starting from selecting a new middle interval in operation 604. Responsive to determining that no intervals remain to search, the system may return the identified overlapping intervals.

Disjoint Hash Table Search and Disjoint Point Search

In some embodiments, variations may be made to method 600 for special cases. For example, when the set of intervals associated with the search hash code obtained in step 602 is disjoint, the interval hash table may be referred to as a disjoint interval hash table. In this case, the ordering of intervals does not depend on which end point of a respective set is used to order the intervals, so the ordering may be based on either end point of the respective set. For example, ordering the intervals based on a low end point of a respective interval, as in step 602, would produce the same ordering as if based on a high end point of a respective interval.

For a general case of disjoint interval hash table search, in some embodiments, the system may perform a nested binary search, rather than a single one-sided binary search. The nested binary search may involve two one-sided binary searches. This is because the disjoint intervals cannot overlap each other, and therefore at most one can overlap each end point of the search sub-interval. Thus, linear probing may be needed only to determine which disjoint intervals overlap the interior of the sub-interval.

In some embodiments, subsequent to determining in decision 606 that the respective search sub-interval can overlap the middle interval, the system may then perform an inner one-sided binary search. The inner one-sided binary search may include evaluating a second, sufficient condition (described further below) to determine whether an inner middle interval overlaps with the respective search sub-interval. Responsive to determining that the inner middle interval and search sub-interval overlap, the system may then perform linear probing to identify all intervals between an inner minimum and inner maximum that overlap with the search sub-interval. Responsive to determining that the inner middle interval and search sub-interval do not overlap, the system may then bisect the inner binary search region. For example, in some embodiments where the outer search involves pruning the upper half of the set of intervals, in the inner search the system may then prune the lower half of the inner array, i.e. from the inner minimum to inner middle interval. In some embodiments, the outer search may instead involve pruning the lower half of the set of intervals, and the inner search may then involve pruning the upper half of the inner array.

In some embodiments, there also may be specializations for point search, that is, for cases when the search interval is a single element. In such cases, the system may perform interval search as in method 600, but specifying only a single search sub-interval with equal low and high end points, i.e., the search sub-interval may equal the point being searched. Furthermore, the search hash code may be the hash code associated with this point by the locality-preserving hash function.

In some embodiments, there also may be specializations for point search in a disjoint interval hash table. In some embodiments, point search in a disjoint interval hash table may involve a standard (i.e., two-sided) binary search rather than a one-sided binary search. In the case of disjoint point search, the conditions for using standard binary search are satisfied because the disjoint intervals are strictly ordered, and at most one such interval can overlap with the point being searched. Thus, during operation, the system may obtain a disjoint, ordered set of intervals associated with a search hash code, wherein the ordering may be according to either end point of the intervals. The system may then obtain an index of a middle interval in the set of intervals. The system may then determine whether the middle interval can overlap the search point by determining whether a low end point of the middle interval exceeds the search point. Responsive to determining that overlapping is impossible (e.g., that the low end point of the middle interval exceeds the search point), the system may prune the upper half of the set of intervals by discarding the middle interval and all intervals above it. The system may then continue searching. Responsive to determining that overlapping is possible, the system may then determine whether the middle interval overlaps the search point by determining whether a high end point of the middle interval exceeds or equals the search point. Responsive to determining that the middle interval does not overlap the search point (e.g., that the high end point of the middle interval is less than the search point), the system may prune the lower half of the set of intervals by discarding the middle interval and all intervals below it. The system may then continue searching. Responsive to determining that the middle interval overlaps the search point, the system may identify the middle interval as the found overlapping interval, and return an index of the middle interval.

Overlapping and Consecutive Intervals

Figure 7A:
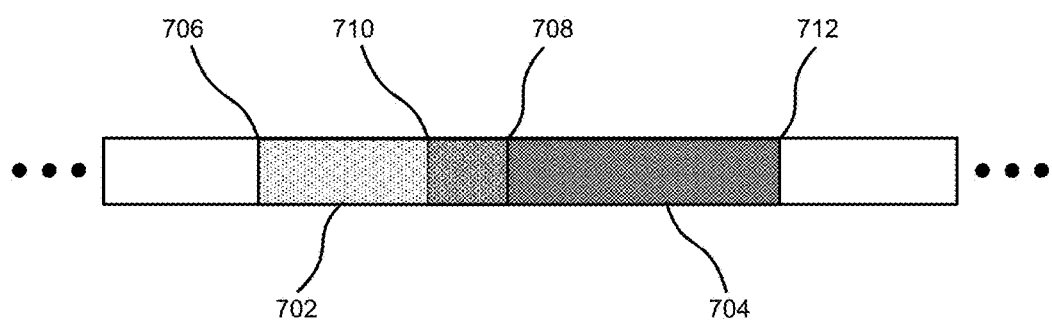
FIG. 7A illustrates an example of overlapping intervals.

FIG. 7A illustrates an example of overlapping intervals 702 and 704. As in method 600, it is possible to determine whether intervals 702 and 704 overlap by comparing their low and high end elements, because an interval can be defined by its low and high end elements. That is, an interval's low end point never exceeds its high end point, and the interval always contains all elements intermediate to its two ends. Because intervals can be defined by their two end points, there are two conditions for overlap that are together necessary and sufficient.

As in method 600, specifying just one of these conditions provides a necessary condition for overlap, which can be used to test whether overlap is possible. For example, as illustrated in FIG. 7A, interval 702 has low and high end points 706 and 708, respectively, and 704 has low and high end points 710 and 712, respectively. If the high end point 708 of a first interval 702 exceeds or equals the low end point 710 of a second interval 704, then overlap is possible.

However, the two intervals might still fail to overlap if the entire first interval exceeds the entire second interval. Therefore, in order to overlap, the low end point 706 of the first interval 702 must also be less than or equal to the high end point 712 of the second interval 704.

Figure 7B:
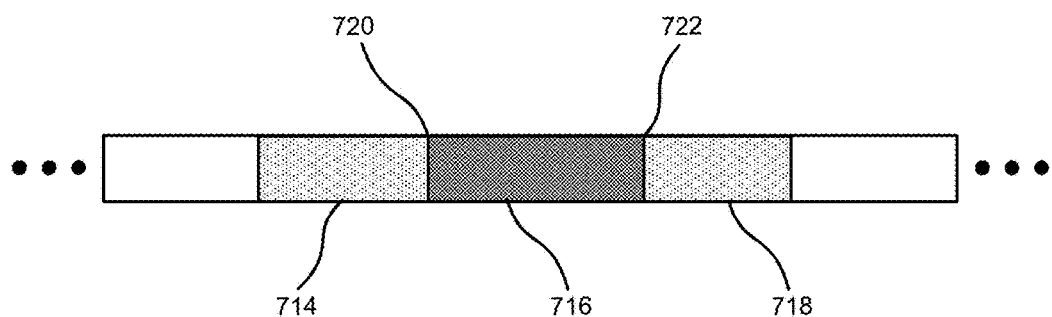
FIG. 7B illustrates an example of consecutive intervals.

FIG. 7B illustrates an example of consecutive intervals 714, 716, and 718. As shown, consecutive intervals have no empty space between them, but instead overlap at a single boundary point. For example, intervals 714 and 716 share boundary element 720, and intervals 716 and 718 share boundary element 722.

In some embodiments, consecutive intervals may be stored or processed more efficiently than general intervals. In some embodiments, the system only stores a respective interval's low end point, and its high end point is implied by the low end point of the next interval. For a set of perfectly consecutive intervals, such a storage method can reduce memory requirements by 50% compared to storing the low and high end points.

To handle cases in which a majority (but not all) of intervals are consecutive, an interval hash table may insert dummy intervals in between the closest non-consecutive intervals to restore the consecutive property. For example, if a first and second interval such as 714 and 718 are not consecutive, the system may add a dummy interval such as 716 between the first and second intervals to restore the consecutive property. Adding dummy intervals may add some storage overhead, but if the majority of intervals are still consecutive, the overall memory requirement can still be reduced compared to storing the full intervals. The dummy interval should be annotated properly (e.g., with an interval ID of 0 or −1) to indicate that it is not one of the original intervals.

Performance, Experiment Results, and Applications

The present invention has many applications, including internet and packet routing, classless inter-domain routing (CIDR), geo-IP search, IP-to-median-income lookup, geographical information systems, memory management, garbage collection, persistent object-oriented databases, and web-server access control. For example, geo-IP search may be used in Customer Care to find the geo-location of a customer based on his or her IP address (for recommendation and customization).

Figure 8:
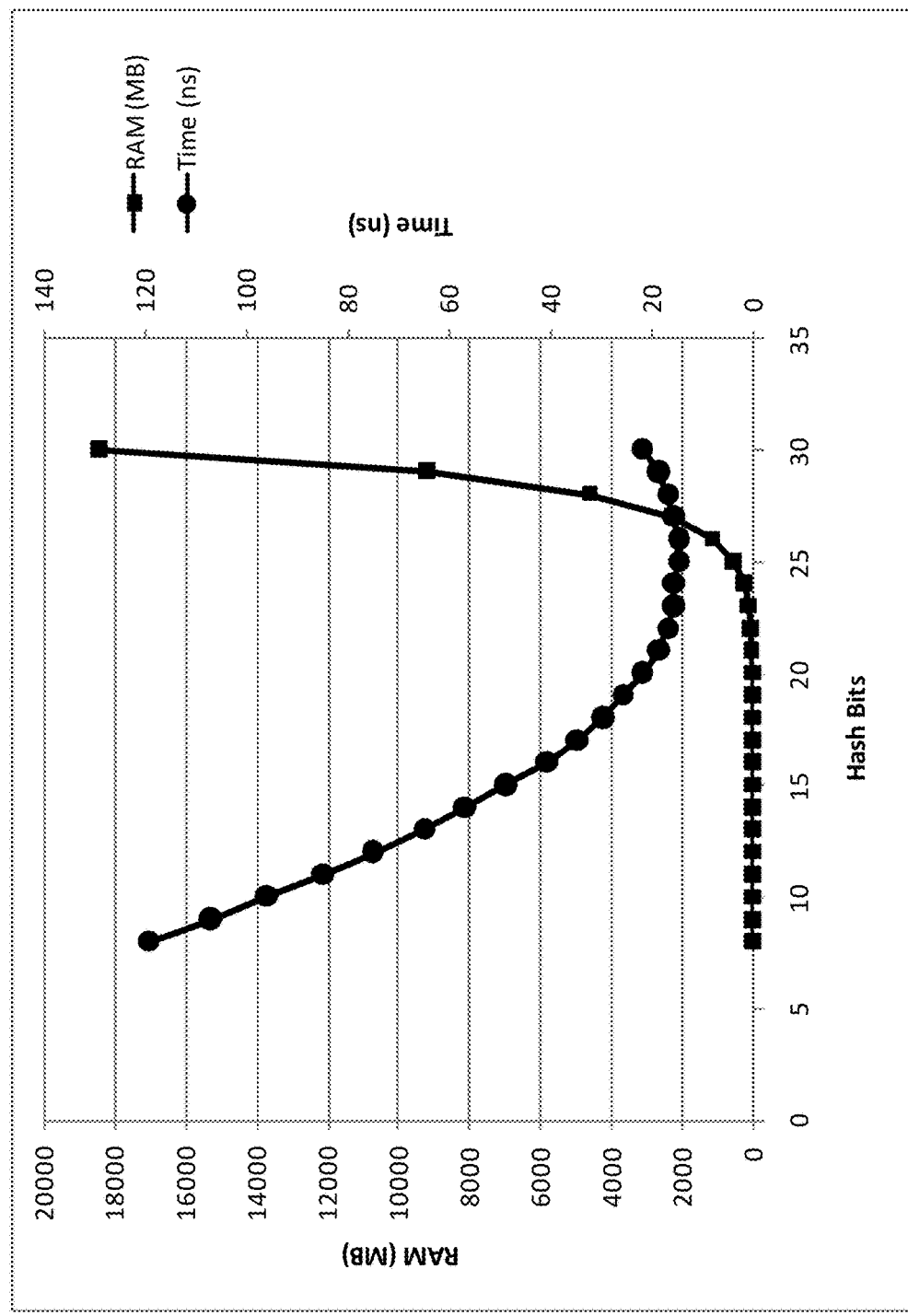
FIG. 8 illustrates runtime and memory performance of the present invention, based on experimental results.

FIG. 8 shows exemplary runtime performance and memory usage of the present invention. This figure is based on experimental results obtained by the inventor using interval search methods like in method 600 with just one thread for classless inter-domain routing (CIDR) block lookup in a database of approximately 3 million blocks. In CIDR, an IP packet is routed based on its corresponding CIDR block, which represents a consecutive block of IP addresses with a common prefix. As illustrated in the figure, in some embodiments, the system can trade off lower memory requirements in exchange for better computational speed, while still performing well with respect to both criteria.

As shown in FIG. 8, the fastest search time of 15 ns with only a single thread is achieved when 25 or 26 hash bits are used, a significant improvement over previous technology. In the past, such speeds were often achieved only by using special hardware, as found in network routers. Beyond 26 hash bits, the side effect of cache misses overtakes the benefits of hashing, causing the search time to increase rather than decrease. The memory requirements start to grow more rapidly as the number of hash bits is above 24. This is understood since the CIDR blocks with 24 prefix bits account for 40% of all CIDR blocks in the test data, and the number of quantized intervals for these blocks will double for each additional hash bit used beyond 24.

The interval hash table disclosed herein can improve runtime significantly compared to an interval tree while maintaining a reasonable memory footprint. In certain cases, interval hash tables can also be more space-efficient than interval trees, allowing more intervals to be stored and searched. More importantly, interval hash tables offer a spectrum of time-space tradeoffs that cannot be easily achieved by interval trees, or other data structures such as linked lists or arrays of (sorted) intervals. This makes it possible to use the same interval hash table implementation in different applications with various real-time and storage requirements.

It is known that ordinary hash tables do not enjoy a worst-case complexity advantage over their binary search tree counterparts. The same holds true for interval hash tables, which do not have reduced time complexity in the worst case. However, the average-case complexity is typically in favor of hash tables. For interval hash tables, the average-case complexity depends not only on the total number of the original, un-quantized intervals but also on the number of quantized intervals. Let q be the number of quantized intervals for the query interval, let r be the average number of quantized intervals for each un-quantized interval, and let m be the minimum of q and r. The average complexity for interval queries in a hash table that allows overlapping intervals is $O(k\,m+q)$, where k is the number of intervals found. In addition to k, the average complexity is affected by q and r, because each of the k overlapping intervals can be repeatedly discovered for r times on average if $q>r$, or at most q times if $q \leq r$. The same average-case complexity of $O(k\,m+q)$ applies to disjoint interval hash tables. For point queries, however, interval quantization doesn't incur any complexity penalty, because the search is always limited to a single hash code (i.e., q=1). That is, both q and r have no impact on the complexity of point search. For disjoint interval hash tables, there is an extra advantage that only a single overlapping interval can be found, and thus the average-case complexity for point search is $O(1)$, a constant time operation. Table 1 summarizes the average-case time complexity for these four cases.

TABLE 1

Average-case time complexity for interval hash tables

| | Interval query | Point query |
|---|---|---|
| Overlapping intervals | $O(k\,m+q)$ | $O(k)$ |
| Disjoint intervals | $O(k\,m+q)$ | $O(1)$ |

Recall the average-case time complexity of interval trees is O(log n+k), where n is the number of intervals. Interval hash tables enjoy a complexity advantage over interval trees, as long as k m+q<log n+k, which can hold for large n's. The average-case complexity advantage of point search is even more significant, because it does not depend on n, q, or r.

Asymptotic Optimality:

It is straightforward to show that the average complexity of an interval hash table for point search is asymptotically optimal, because it takes at least O(k) time to print the query result. To the best knowledge of the inventor, this is so far the only data structure that performs asymptotically optimal point-based interval search.

Space Complexity:

The space complexity of interval hash tables is O(n q'), which may be higher than interval tree's O(n) space complexity, since q'≥1. However, there are cases in which an interval hash table needs less memory than an interval tree. For example, on a 64-bit system, a pointer would need 8 bytes of storage. If the low and high end points were encoded in 32-bit integers or floats, then an interval would require 24 bytes to store in an interval tree. Since an interval hash table doesn't need to use pointers, a quantized interval can take 12 bytes of storage, plus 8 bytes to store the original, un-quantized interval. The total memory requirement (excluding the hash table index array) would be 12r+8 bytes on the same 64-bit system, and as long as r<1.33, an interval hash table can be more space efficient than an interval tree.

For example, in the CIDR experiment above, there are 2,978,567 CIDR blocks, so if each CIDR block is encoded as a pair of minimum and maximum IPv4 addresses using 32-bit integers, then it would take 2,978,567×8=23,828,536 bytes to store just the CIDR blocks. Adding in the space overhead of interval quantization, the total memory requirement (including the hash table index array and the original, un-quantized intervals) is about twice the size of CIDR blocks, when the number of hash bits used is small (e.g., 8 or 9). For comparison, an interval tree would require 2,978,567×16=47,657,072 bytes on 32-bit machines or 2,978,567×24=71,485,608 bytes on 64-bit machines to store the same intervals. In other words, interval hash tables are more space-efficient than interval trees on 64-bit machines, if no more than 20 hash bits are used.

Exemplary Apparatus

Figure 9:
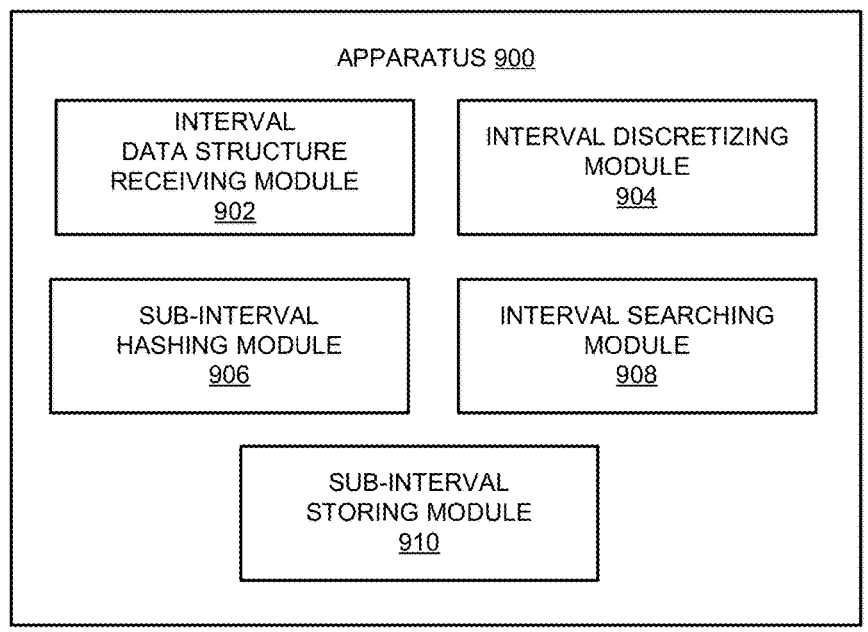
FIG. 9 presents a block diagram illustrating an exemplary apparatus for interval search and hashing, in accordance with embodiments of the present invention.

FIG. 9 presents a block diagram illustrating an exemplary apparatus 900 that facilitates interval search and hashing, in accordance with some embodiments. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise an interval data structure-receiving module 902, an interval-discretizing module 904, a sub-interval-hashing module 906, an interval-searching module 908, and a sub-interval-storing module 910. Note that apparatus 900 may also include additional modules not depicted in FIG. 9.

In some embodiments, interval data structure-receiving module 902 can receive data comprising a representation of intervals. Interval-discretizing module 904 may divide intervals into discrete sub-intervals. Sub-interval-hashing module 906 may use a locality-preserving hash function to obtain hash code values for sub-intervals. Interval-searching module 908 may search an interval hash table for intervals overlapping with a given query interval or point. Sub-interval-storing module 910 may store sub-intervals in an interval hash table data structure. Note that interval hash table module 202 illustrated in FIG. 2 may provide any and all functions of the various modules depicted in FIG. 9.

Exemplary System

Figure 10:
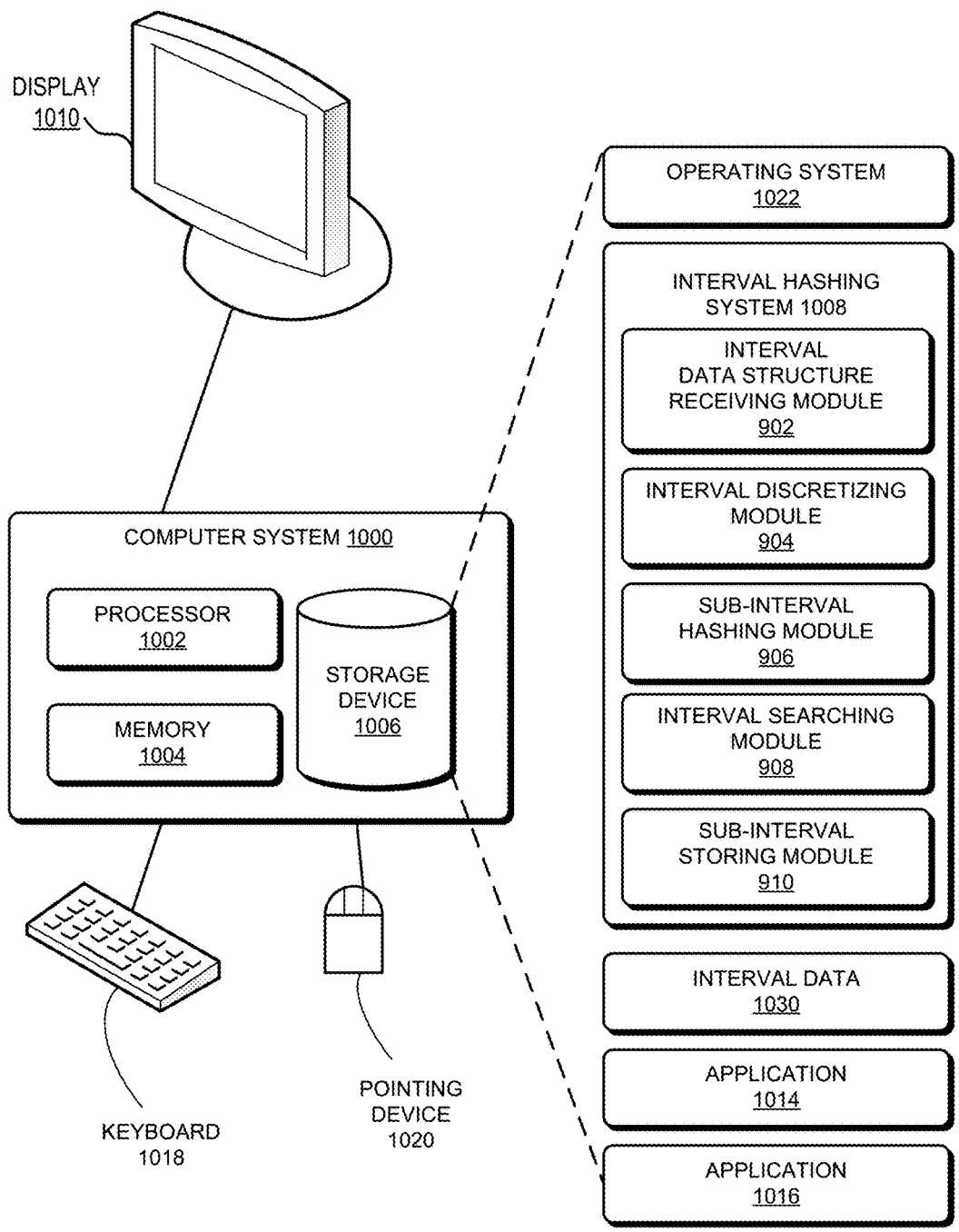
FIG. 10 presents a block diagram illustrating an exemplary computer system for interval search and hashing, in accordance with embodiments of the present invention.

FIG. 10 illustrates an exemplary interval search and hashing computer system 1000, in accordance with some embodiments. In some embodiments, computer system 1000 may be a server. In some embodiments, system 1000 includes a processor 1002, a memory 1004, and a storage device 1006. In some embodiments, 1002 may include a set of processors. Storage device 1006 may store a number of applications, such as applications 1014 and 1016, which may make use of interval search and hashing according to embodiments of the present invention, and operating system 1022. Storage device 1006 also stores interval hashing system 1008 that may include comprise an interval data structure-receiving module 902, an interval-discretizing module 904, a sub-interval-hashing module 906, an interval-searching module 908, and a sub-interval-storing module 910. System 1000 and/or interval data structure-receiving module 902 may receive or generate interval data 1030 comprising interval data and may copy interval data to a memory section accessible to interval hashing system 1008. During operation, one or more applications, such as interval hashing system 1008, are loaded from storage device 1006 into memory 1004 and then executed by processor set 1002. While executing the program, processor set 1002 performs the aforementioned functions. System 1000 may be coupled to a display 1010, a keyboard 1018, and a pointing device 1020.

In some embodiments, interval data structure-receiving module 902 can receive data comprising a representation of intervals. Interval-discretizing module 904 may divide intervals into discrete sub-intervals. Sub-interval-hashing module 906 may use a locality-preserving hash function to obtain hash code values for sub-intervals. Interval-searching module 908 may search an interval hash table for intervals overlapping with a given query interval or point. Sub-interval-storing module 910 may store sub-intervals in an interval hash table data structure. Note that interval hash table module 202 illustrated in FIG. 2 may provide any and all functions of the various modules depicted in FIG. 10.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a fieldprogrammable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for performing an interval search, the method comprising:
   receiving a search query comprising a search interval;
   dividing the search interval into a set of search sub-intervals based on a locality-preserving hash function;
   obtaining, via the locality-preserving hash function, a search hash code associated with a respective search sub-interval; and
   searching an interval hash table for intervals that overlap with the respective search sub-interval based on the search hash code, wherein the interval hash table is constructed by dividing a respective interval to a plurality of sub-intervals and mapping a respective sub-interval to a hash code based on the locality-preserving hash function, and wherein dividing the respective interval further comprise:
   obtaining, via the locality-preserving hashing, a low hash code for a lowest-ordered element and a high hash code for a highest-ordered element of the respective interval;
   forming a set of hash codes including the low hash code, a hash code intermediate to the low and high hash codes, and the high hash code;
   obtaining a maximal interval associated only with a respective hash code in the set of hash codes, wherein the maximal interval is not subsumed by any larger interval associated only with the respective hash code; and
   identifying a respective sub-interval associated with the respective hash code based on the obtained maximal interval and the lowest-ordered element and highest-ordered element of the respective interval.

2. The method of claim 1, wherein the interval hash table is further constructed by inserting the respective sub-interval into the interval hash table based on the mapped hash code.

3. The method of claim 1:
   wherein the interval hash table is a disjoint interval hash table, such that the searched intervals associated with the search hash code are disjoint;
   wherein the respective search sub-interval comprises a single search element, such that the lowest- and highest-ordered elements of the respective search sub-interval equal the search element; and
   wherein determining whether a respective interval overlaps with the search element further comprises using a binary search.

4. The method of claim 1, further comprising performing a classless inter-domain routing (CIDR) block lookup based on the interval hash table.

5. The method of claim 1, wherein searching for intervals that overlap with the respective search sub-interval further comprises using a one-sided binary search, which comprises:

obtaining a set of intervals associated with the search hash code ordered based on a respective lowest-ordered element of a respective interval; and
   responsive to determining that the respective search sub-interval cannot overlap a middle interval in the obtained set of intervals, discarding intervals in the ordered set ordered on one side of the middle interval.

6. The method of claim 5:
   wherein the interval hash table is a disjoint interval hash table, such that the obtained set of intervals associated with the search hash code is disjoint; and
   wherein using the one-sided binary search further comprises using a nested binary search, which comprises:
   responsive to determining that the respective search sub-interval can overlap the middle interval, performing an inner one-sided binary search.

7. The method of claim 1:
   wherein the interval hash table is a consecutive interval hash table that represents a respective interval by storing a single lowest-ordered or highest-ordered element; and
   wherein, responsive to two respective intervals being separated by an empty space, the consecutive interval hash table further comprises a dummy interval representing the empty space intermediate to the two respective intervals.

8. A non-transitory computer-readable storage medium storing instructions that when executed by a computer cause the computer to perform a method for performing an interval search, the method comprising:
   receiving a search query comprising a search interval;
   dividing the search interval into a set of search sub-intervals based on a locality-preserving hash function;
   obtaining, via the locality-preserving hash function, a search hash code associated with a respective search sub-interval;
   searching an interval hash table for intervals that overlap with the respective search sub-interval based on the search hash code, wherein the interval hash table is constructed by dividing a respective interval to a plurality of sub-intervals and mapping a respective sub-interval to a hash code based on the locality-preserving hash function, and wherein dividing the respective interval further comprise:
   obtaining, via the locality-preserving hashing, a low hash code for a lowest-ordered element and a high hash code for a highest-ordered element of the respective interval;
   forming a set of hash codes including the low hash code, a hash code intermediate to the low and high hash codes, and the high hash code;
   obtaining a maximal interval associated only with a respective hash code in the set of hash codes, wherein the maximal interval is not subsumed by any larger interval associated only with the respective hash code; and
   identifying a respective sub-interval associated with the respective hash code based on the obtained maximal interval and the lowest-ordered element and highest-ordered element of the respective interval.

9. The non-transitory computer-readable storage medium of claim 8, wherein the interval hash table is further constructed by inserting the respective sub-interval into the interval hash table based on the mapped hash code.

10. The non-transitory computer-readable storage medium of claim 8, wherein searching for intervals that overlap with the respective search sub-interval further comprises using a one-sided binary search, which comprises:
  obtaining a set of intervals associated with the search hash code ordered based on a respective lowest-ordered element of a respective interval; and
  responsive to determining that the respective search sub-interval cannot overlap a middle interval in the obtained set of intervals, discarding intervals in the ordered set ordered on one side of the middle interval.

11. The non-transitory computer-readable storage medium of claim 10:
  wherein the interval hash table is a disjoint interval hash table, such that the searched intervals associated with the search hash code are disjoint; and
  wherein using the one-sided binary search further comprises using a nested binary search, which comprises:
    responsive to determining that the respective search sub-interval can overlap the middle interval, performing an inner one-sided binary search.

12. The non-transitory computer-readable storage medium of claim 8:
  wherein the interval hash table is a consecutive interval hash table that represents a respective interval by storing a single lowest-ordered or highest-ordered element; and
  wherein, responsive to two respective intervals being separated by an empty space, the consecutive interval hash table further comprises a dummy interval representing the empty space intermediate to the two respective intervals.

13. A computing system for hashing an interval, the system comprising:
  a set of processors; and
  a non-transitory computer-readable medium coupled to the set of processors storing instructions thereon that, when executed by the processors, cause the processors to perform a method for performing an interval search, the method comprising:
    receiving a search query comprising a search interval;
    dividing the search interval into a set of search sub-intervals based on a locality-preserving hash function;
    obtaining, via the locality-preserving hash function, a search hash code associated with a respective search sub-interval;
    searching an interval hash table for intervals that overlap with the respective search sub-interval based on the search hash code, wherein the interval hash table is constructed by dividing a respective interval to a plurality of sub-intervals and mapping a respective sub-interval to a hash code based on the locality-preserving hash function, and wherein dividing the respective interval further comprise:
      obtaining, via the locality-preserving hashing, a low hash code for a lowest-ordered element and a high hash code for a highest-ordered element of the respective interval;
      forming a set of hash codes including the low hash code, a hash code intermediate to the low and high hash codes, and the high hash code;
      obtaining a maximal interval associated only with a respective hash code in the set of hash codes, wherein the maximal interval is not subsumed by any larger interval associated only with the respective hash code; and
      identifying a respective sub-interval associated with the respective hash code based on the obtained maximal interval and the lowest-ordered element and highest-ordered element of the respective interval.

14. The computing system of claim 13, wherein the interval hash table is further constructed by inserting the respective sub-interval into the interval hash table based on the mapped hash code.

15. The computing system of claim 13, wherein searching for intervals that overlap with the respective search sub-interval further comprises using a one-sided binary search, which comprises:
  obtaining a set of intervals associated with the search hash code ordered based on a respective lowest-ordered element of a respective interval; and
  responsive to determining that the respective search sub-interval cannot overlap a middle interval in the obtained set of intervals, discarding intervals in the ordered set ordered on one side of the middle interval.

16. The computing system of claim 13:
  wherein the interval hash table is a disjoint interval hash table, such that the searched intervals associated with the search hash code are disjoint; and
  wherein using the one-sided binary search further comprises using a nested binary search, which comprises:
    responsive to determining that the respective search sub-interval can overlap the middle interval, performing an inner one-sided binary search.

17. The computing system of claim 13:
  wherein the interval hash table is a consecutive interval hash table that represents a respective interval by storing a single lowest-ordered or highest-ordered element; and
  wherein, responsive to two respective intervals being separated by an empty space, the consecutive interval hash table further comprises a dummy interval representing the empty space intermediate to the two respective intervals.

* * * * *